United States Patent [19]
Wu

[11] Patent Number: 4,562,991

[45] Date of Patent: Jan. 7, 1986

[54] REUSABLE ICE MOLD

[76] Inventor: Gerald Wu, 13423¼ Village Dr., Cerritos, Calif. 90701

[21] Appl. No.: 670,499

[22] Filed: Nov. 13, 1984

[51] Int. Cl.⁴ ............................................. B29C 1/00
[52] U.S. Cl. ..................... 249/141; 249/55; 249/117; 249/163
[58] Field of Search ................ 249/55, 117, 119, 121, 249/127, 141, 160, 163, 82, 105, 106; 425/546, 812; 264/102, 328.1

[56] References Cited

U.S. PATENT DOCUMENTS

| | | | |
|---|---|---|---|
| 211,859 | 2/1879 | Manley | 249/55 |
| 2,083,081 | 6/1937 | Moll | 249/120 |
| 2,939,299 | 6/1960 | Sherbloom | 249/55 |
| 3,233,562 | 2/1966 | Nakamura | 249/141 |
| 4,066,797 | 1/1978 | McNair | 249/130 |
| 4,201,289 | 5/1980 | Mack et al. | 249/117 |
| 4,206,899 | 6/1980 | Whitehead | 249/139 |
| 4,407,766 | 10/1983 | Haardt et al. | 249/160 |
| 4,417,716 | 11/1983 | Penna et al. | 249/165 |

*Primary Examiner*—Jay H. Woo
*Assistant Examiner*—James C. Housel
*Attorney, Agent, or Firm*—Paul L. Hickman

[57] ABSTRACT

An ice mold characterized by a lower mold section having an upwardly extending outer retainer wall and an upper mold section which fits within the outer retainer wall and which has an upwardly extending inner retainer wall. An annular void is formed between the retainer walls when the mold sections are engaged to provide an expansion space for the water as it freezes and to eliminate the need for a seal between the mold portions.

9 Claims, 7 Drawing Figures

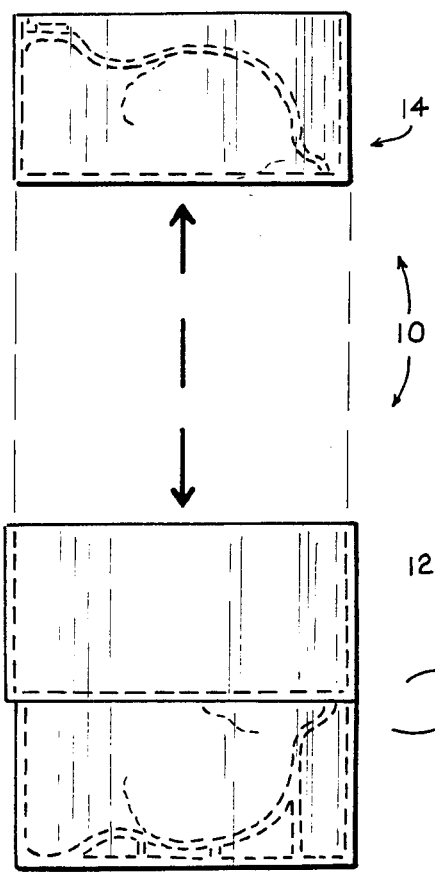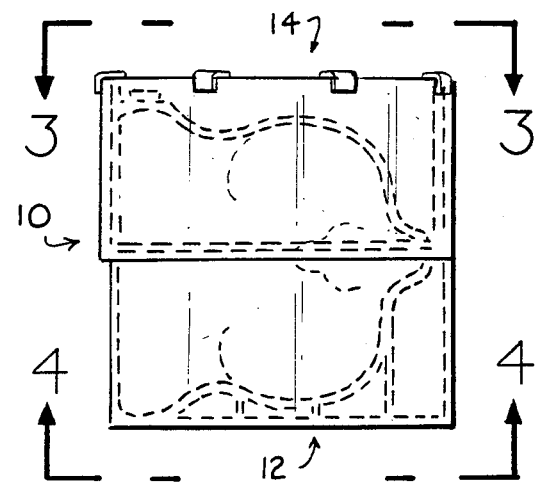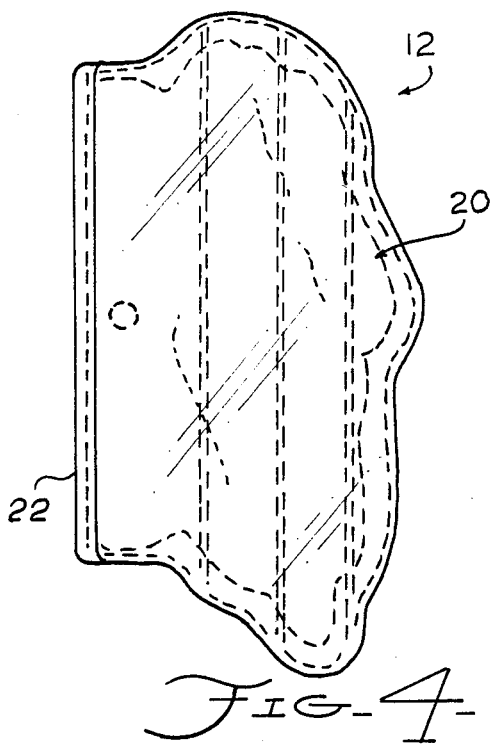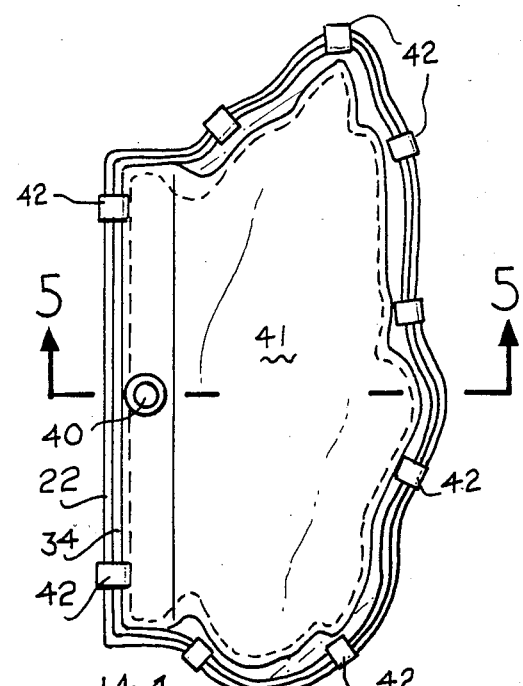

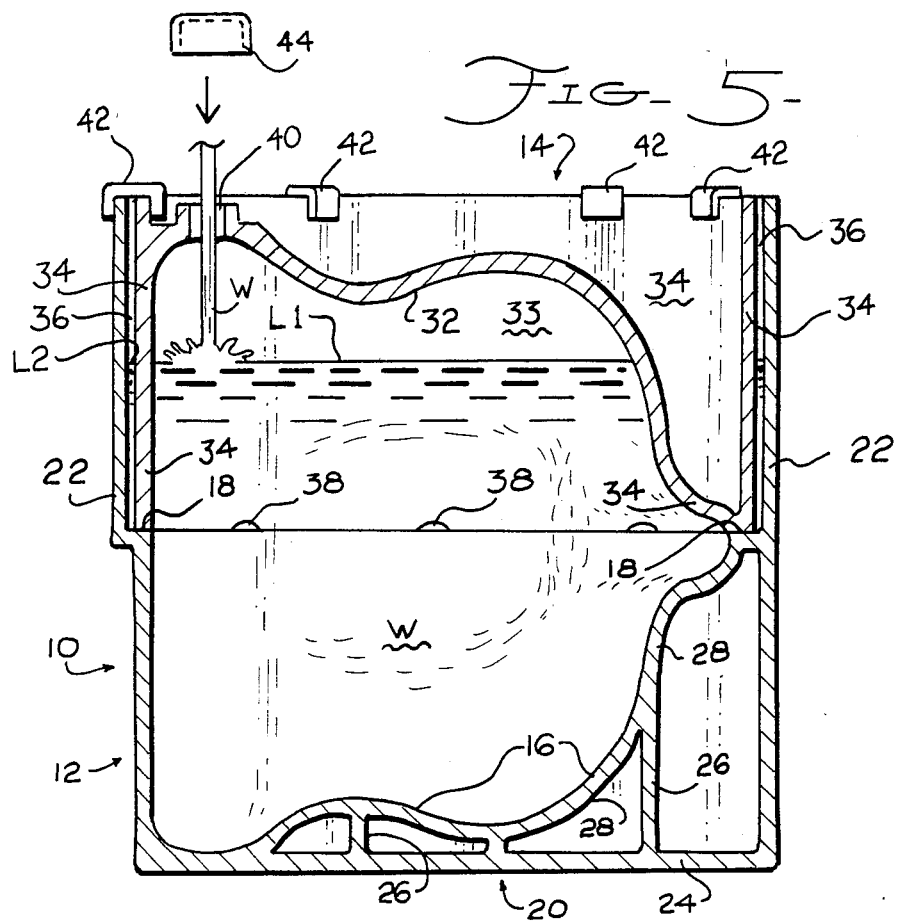
FIG-5-
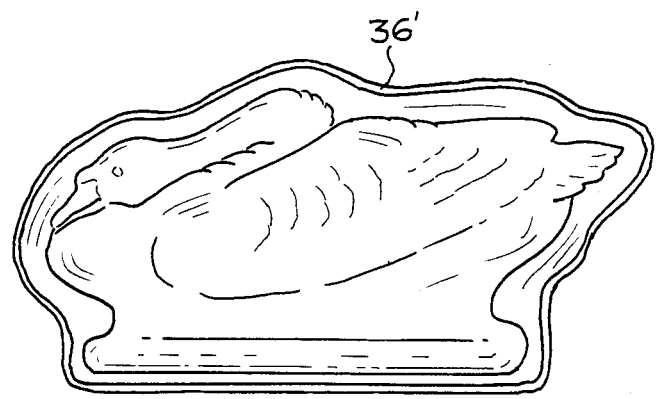
FIG-6-
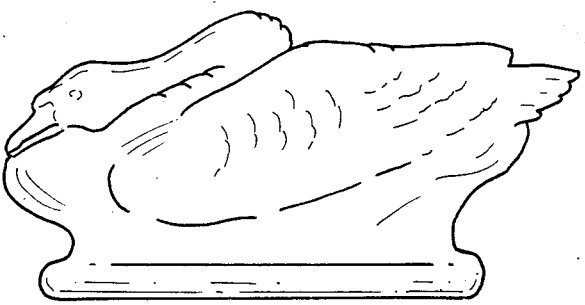
FIG-7-

REUSABLE ICE MOLD

BACKGROUND OF THE INVENTION

1. Field of the Invention

This invention relates generally to molds, and more particularly to molds for ice sculptures.

2. Description of the Prior Art

Ornamental ice sculptures are often used as centerpieces at banquets, receptions, and other social functions. Ice sculptures are usually carved by hand from a large block of ice in a labor intensive and expensive manner.

A solution to this problem is to provide a mold into which water can be poured and subsequently frozen. For example, in U.S. Pat. No. 4,206,899 of Whitehead, a method and apparatus for forming molded ice sculptures includes a mold fabricated from a flexible, resilient plastic material. The mold includes holes in its base through which support wires are inserted. The mold is inverted, base up, within a box slightly larger than the mold with the wires engaging the open top of the box and supporting the mold. After the mold is filled with water and frozen, it is removed from the box and the mold is stripped from the frozen sculpture.

A problem with ice molds of the type taught by Whitehead is that they are single part molds and thus cannot fully surround the finished ice sculpture to mold every part of its surface. Also, the mold of Whitehead is restricted to sculptures which taper more or less uniformly from top to bottom or vice versa so that it can be removed from the finished sculpture. The Whitehead mold could not, for example, be used to mold a ice sculpture having a relatively small top and bottom portions and an enlarged central portion. Furthermore, the Whitehead mold can only be used to make relatively small ice sculptures since the flexible material of the mold cannot retain its shape if too much water was contained within it.

SUMMARY OF THE INVENTION

An object of this invention is to provide a two-part mold for ice sculptures which can produce intricate patterns of virtually any configuration.

Another object of this invention is to provide an ice mold which is compact and free standing.

Briefly, the invention comprises a lower portion having an upwardly facing first mold surface, and a upper portion provided with a concave, downwardly facing second molding surface which cooperates with the first mold surface to provide a mold cavity. The lower portion of the mold is provided with an outer retainer wall upwardly extending from a lip of the first mold surface, and the upper portion is provided with a downwardly extending inner retainer wall which engages the lip of the lower portion of the mold.

The outer retainer wall and the inner retainer wall are spaced apart when the lower portion and the upper portion of the mold are engaged, so that an annular void is formed therebetween which extends above the uppermost surface of the second mold surface. When water is poured into the mold cavity through the upper portion of the mold, it will completely fill the cavity and a column of water will rise within the annular void of the retainer walls. When the water within the mold is frozen, the annular void allows the freezing water to expand, preventing the rupturing of the mold.

An advantage of this invention is that an inexpensive, simple two-piece mold is provided which does not require a seal between the two mold surfaces.

Yet another advantage of this invention is that it provides a mold which is rupture proof.

These and other objects and advantages of the present invention will no doubt become apparent upon a reading of the following descriptions and a study of the several figures of the drawing.

BRIEF DESCRIPTION OF THE DRAWING

FIG. 1 is an exploded side elevational view of a two part ice mold in accordance with the present invention;

FIG. 2 is a side elevational view with the two mold parts engaged;

FIG. 3 is a top plan view of the upper mold portion taken along line 3—3 of FIG. 2;

FIG. 4 is a bottom plan view of the lower mold portion taken along line 4—4 of FIG. 2;

FIG. 5 is a cross sectional view taken along line 5—5 of FIG. 3

FIG. 6 is a view of an ice sculpture just after it has been removed from the mold; and FIG. 7 is a view of the finished ice sculpture.

DETAILED DESCRIPTION OF THE PREFERRED EMBODIMENT(S)

Referring generally to FIGS. 1–5, an ice mold 10 in accordance with the present invention includes a lower mold portion 12 and an upper mold portion 14. The two mold portions 12/14 (as seen in FIG. 1) can be fitted together into a single, unitary mold (as seen in FIG. 2).

Referring now more particularly to FIGS. 4 and 5, lower portion 12 includes a concave, upwardly facing first mold surface 16, a first lip 18 provided around the mouth of mold surface 16, and a support surface 20 for supporting lower portion 12 in a substantially upright position. An outer retainer wall 22 extends upwardly from first lip 18.

Support surface 20 includes a base portion 24 and a plurality of struts 26 supporting a surface 28, which is opposite to first mold surface 16. The various sections of lower portion 12 thus form a self-supporting, upwardly facing container having an annularly extending shoulder comprised of lip 18.

Referring now more particularly to FIGS. 3 and 5, upper portion 14 includes a concave, downwardly facing second mold surface 32 which may cooperate with first mold surface 16 to form a mold cavity 33, a second lip 34 adapted to engage first lip 18 of the lower portion 12, and an inner retainer wall 34 which extends upwardly from lip 34. When upper portion 14 is engaged with lower portion 16, an annular void 36 is formed which, as will be explained subsequently, serves as an expansion outlet for the freezing water.

Upper mold portion 14 is provided with the plurality of small apertures 38 which permits communication between the mold cavity 33 and annular void 36. Optionally, the apertures may be formed in the lower mold portion 12. A fill hole 40 is provided through upper surface 42 to permit the mold cavity 33 to be filled with water. A number of resilient, U-shaped clips 42 attach outer retainer wall 22 to inner retainer wall 34.

In use, upper portion 14 is engaged with lower portion 12 as suggested in FIG. 1. Water W is poured through fill hole 40 to fill the mold cavity 33. It should be noted that the level L1 of the water within the mold cavity 33 is as same as the level L2 within annular void 36. When the mold cavity 33 has been filled to capacity, a cap 44 is used to close the opening of fill hole 40, and clips 44 are engaged with outer retainer wall 22 and inner retainer wall 34 to hold the mold together. The entire assembly is then placed in a refrigerated environment to freeze the water W.

As the water freezes, it will tend to expand through apertures 38 and into annular void 36. Thus, the annular void provides an expansion outlet which prevents the rupturing of the mold. It should be noted that no seal is required between lip 18 of the lower portion 12 and lip 34 of upper portion 14.

After the water W has completely frozen into ice, clips 42 are removed and mold portions are separated as suggested in the FIG. 1. As seen in FIG. 6, a fully formed ice sculpture is formed having a shell of ice 36' from annular void 36 surrounding one half of it. This shell of ice is chipped away and the sculpture is smoothed to produce the final sculpture as seen in FIG. 7.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An ice mold comprising:
   a lower portion provided with a concave, upwardly facing first mold surface, a first lip provided around a mouth of said first mold surface, an outer retainer wall extending upwardly from said first lip, and a support surface for supporting said lower portion in a substantially upright position; and
   an upper portion provided with a concave, downwardly facing second mold surface which cooperates with said first mold surface to form a mold cavity, a second lip provided around a mouth of said second mold surface which is a mirror image of and which is engagable with said first lip, an inner retainer wall extending upwardly from said second lip such that an annular void is formed between said inner retainer wall and said outer retainer wall which freely communicates with and extends at least to the height of said mold cavity, and filler means provided in said upper portion which permits a liquid to be poured into said ice mold to fill said mold cavity and said annular void.

2. An ice mold as recited in claim 1 wherein said annular void extends above said mold cavity.

3. An ice mold as recited in claim 2 wherein the juncture between said first lip and said outer retainer wall forms a shoulder upon which said second lip may rest.

4. An ice mold as recited in claim 2 wherein at least one of said lower portion and said upper portion is provided with an aperture which permits fluid communication between said mold cavity and said annular void.

5. An ice mold as recited in claim 2 wherein said support surface includes a substantially planar portion, and wherein at least one substantially vertical web couples said planar portion to a wall portion of said first mold surface.

6. An ice mold as recited in claim 2 further comprising means for attaching said upper portion and said lower portion together.

7. An ice mold as recited in claim 2 wherein said inner retainer wall and said outer retainer wall are of substantially the same height.

8. An ice mold as recited in claim 7 further comprising means for attaching said inner retainer wall and said outer retainer wall together.

9. An ice mold as recited in claim 8 wherein said means for attaching said inner retainer wall and said outer retainer wall together comprise a plurality of clips which fasten over the top of said inner retainer wall and said outer retainer wall.

* * * * *